US 6,672,836 B2

(12) United States Patent
Merry

(10) Patent No.: US 6,672,836 B2
(45) Date of Patent: Jan. 6, 2004

(54) COOLABLE ROTOR BLADE FOR AN INDUSTRIAL GAS TURBINE ENGINE

(75) Inventor: Brian D. Merry, Andover, CT (US)

(73) Assignee: United Technologies Corporation, Hartford, CT (US)

(*) Notice: Subject to any disclaimer, the term of this patent is extended or adjusted under 35 U.S.C. 154(b) by 103 days.

(21) Appl. No.: 10/014,952

(22) Filed: Dec. 11, 2001

(65) Prior Publication Data

US 2003/0108422 A1 Jun. 12, 2003

(51) Int. Cl.[7] .................................................. F01D 5/18
(52) U.S. Cl. ..................................... 416/97 R; 415/178
(58) Field of Search ............................. 416/97 R, 95; 415/115, 116, 177, 178

(56) References Cited

U.S. PATENT DOCUMENTS

| 4,514,144 | A | 4/1985 | Lee | 416/96 R |
|---|---|---|---|---|
| 4,526,512 | A | 7/1985 | Hook | 416/96 A |
| 5,395,212 | A * | 3/1995 | Anzai et al. | 416/97 R |
| 5,462,405 | A | 10/1995 | Hoff et al. | 416/97 R |
| 5,681,144 | A | 10/1997 | Spring et al. | 416/97 R |
| 5,695,320 | A | 12/1997 | Kercher | 416/97 R |
| 5,695,321 | A | 12/1997 | Kercher | 416/97 R |
| 5,695,322 | A | 12/1997 | Jacobson | 416/97 R |
| 5,700,132 | A | 12/1997 | Lampes | 416/97 R |
| 5,738,493 | A | 4/1998 | Lee et al. | 416/97 R |
| 5,797,726 | A | 8/1998 | Lee | 416/96 R |
| 5,975,850 | A | 11/1999 | Abuaf et al. | 416/97 R |
| 6,068,445 | A | 5/2000 | Beeck et al. | 416/96 R |

* cited by examiner

Primary Examiner—Edward K. Look
Assistant Examiner—Dwayne J. White
(74) Attorney, Agent, or Firm—Gene D. Fleischhauer

(57) ABSTRACT

A coolable rotor blade having an airfoil having two serpentine passages is disclosed. Various construction details are developed for providing cooling to the leading edge region and the trailing edge region of the airfoil. In one detailed embodiment, the airfoil trip strips in the passages having constant height and constant pitch over each leg in most legs of the passages except for the legs closest to the edge regions of the airfoil.

20 Claims, 8 Drawing Sheets

COOLABLE ROTOR BLADE FOR AN INDUSTRIAL GAS TURBINE ENGINE

DESCRIPTION

1. Technical Field

This invention relates to coolable airfoil structures of the type used in industrial gas turbine engines, and more specifically, structure for providing cooling fluid, such as air, to a critical location of the airfoil.

2. Background of the Invention

Gas turbine engines for aircraft have rotor blades that are typically cooled to reduce thermal stresses. Reducing the stresses provides the rotor blade with a satisfactory structural integrity and fatigue life. Very complex cooling designs for the interior of the blade have been developed which employ serpentine passages to provide a flowpath for a cooling fluid, such as air.

Heat transfer features, such as trip strips, for creating flow turbulence are typically used in such applications. The trip strip designs have become complex with variations in trip strip height, continuity and angles to the approaching cooling flow in such passages. These designs focus on the microscopic level of increasing the heat transfer in a very small region of the airfoil although they are generally shown as being applied to the entire airfoil. Examples of such designs are shown in U.S. Pat. No. 5,738,493 entitled "Turbulator Configuration for Cooling Passages of an Airfoil in a Gas Turbine Engine" issued to Lee; U.S. Pat. No. 5,695,321 entitled "Turbine Blade Having Variable Configuration Turbulators" issued to Kercher; and, U.S. Pat. No. 4,514,144 entitled "Angled Turbulence Promoter" issued to Lee.

These heat transfer features increase the ability of the airfoil structure to transfer heat to the cooling fluid which is flowed through the airfoil. One measure is the heat transfer effectiveness of the structure which is the ability of a portion of a passage to transfer heat across a reference difference in temperature between the wall bounding the leg to cooling fluid flowed through the leg at a given flow rate and temperature. Heat transfer effectiveness is increased by an increase in trip strip height under a given operative condition or a decrease in pitch between trip strips with an increased loss of pressure driving the flow as the flow passes over the features. One convenient parameter to examine in correlating results is the normalized trip strip height to pitch ratio, that is, the trip strip height divided by pitch and multiplied by 100.

Having developed these particular features for small regions of the airfoil, the problem is to use them in a way which promotes heat transfer but does not unacceptably increase manufacturing cost. One area of interest is airfoils for industrial gas turbine engines where complex designs have not been routinely used because of the less severe operating conditions of the industrial gas turbine engine as compared to the aircraft gas turbine engine.

Accordingly, scientists and engineers working on the direction of applicants assignee have sought to develop overall cooling schemes for airfoils of industrial gas turbine engines that provide acceptable levels of heat transfer effectiveness and manufacturing cost.

SUMMARY OF INVENTION

This invention is in part predicated on the recognition that an industrial gas turbine engine rotor blade is subjected to maximum heat loads under steady-state operative conditions and has locations for these maximum heat loads whose location remains relatively constant for long periods of time on the airfoil. The location does not change even with circumferential variations in flow path temperature such as might occur with can-type or can-annular combustion chambers. Thus, the time at temperature location is relatively fixed in comparison to aircraft gas turbine engine airfoils. In aircraft gas turbine engines, the maximum heat load typically occurs during transient periods at sea level takeoff condition and decreases in size for the steady-state cruise condition. The size and location of the maximum heat load at these conditions shifts on the airfoil due to different cooling air flows between the conditions and different flow path heat loads on the airfoil because of different temperature and gas velocities in the flowpath. This enables more tailoring of the internal cooling passages for an industrial gas turbine engine and some flexibility in design which permits forming a blade which is more easily fabricated than airfoils for aircraft gas turbine engines. This might occur in industrial engine airfoils by reducing variations, for example, in the designs of the arrays of trip strips as compared to aircraft engine airfoils which must accommodate the shifting locations of maximum heat transfer between operating conditions. In addition, this invention is in part predicated on the recognition that the maximum heat load occurs at the leading edge region and at the trailing edge region for an industrial gas turbine airfoil in one known application which has an airfoil having two serpentine passages which each have three spanwise legs serially connected for flowing cooling air from the midchord region to the leading edge region. The cooling air is flowed to the third leg of each serpentine passage which is closest to an associated edge region of the airfoil and is discharged via the third leg from the serpentine passage. In this known configuration, a leading edge cooling air passage is disposed between the serpentine cooling air passage and the leading edge.

According to the present invention, a coolable rotor blade for an industrial gas turbine engine has an airfoil having two serpentine passages which each have three spanwise legs serially connected for flowing cooling air from the midchord region to an associated edge region of the airfoil and wherein each leg of each serpentine passage has a trip strip height to pitch ratio over at least a portion of the leg which is greater than that of the preceding leg to increase the heat transfer effectiveness of each downstream leg over that of the upstream leg as the cooling air in either serpentine passage moves closer to the associated edge region of the airfoil and has a pitch for the arrays of trip strips in each leg which is constant (except for the rearmost leg which discharges the cooling air along the passage) to promote ease of manufacture and inspectability while providing heat removal that emphasizes the edge regions over the midchord region.

In accordance with one embodiment, the third legs of both the front serpentine passage and the rear serpentine passage have an increased trip strip height as compared to the other legs over at least a portion of the third leg.

According to the present invention, the third legs of both the front serpentine passage and the rear serpentine passage have both a trip strip height and normalized height to pitch ratio over at least a portion of the third leg which is greater than that of the second leg to provide a greater increase of heat transfer effectiveness to the third leg over the second leg than exists between the second leg and the first leg as the flow of cooling air proceeds in the downstream direction.

In accordance with one embodiment, the third leg of each of the two serpentine passages has a first portion which receives cooling air from the second leg and a second portion outwardly of the first portion, the second portion having a trip strip height and a trip strip height to pitch ratio which is greater than that of the first portion and the second leg having either a trip strip height or a trip strip height to pitch ratio which is greater than that of the first leg to sequentially increase the heat transfer effectiveness of the second and third legs in the downstream direction.

In accordance with one embodiment, the first and second legs of each serpentine passage having arrays of trip strips each have no increase over the entire first leg or the entire second leg in the trip strip height and trip strip height to pitch ratio.

In accordance with one embodiment, the rotor blade has a third passage disposed between the leading edge and the third leg of the forward most serpentine passage, the third passage having a first portion adjacent to the root, a second portion adjacent to the tip and having a trip strip height and trip strip height to pitch ratio which is greater than that of the first portion.

A primary feature of the present invention is a coolable airfoil having a front serpentine passage and a rear serpentine passage with the inlet legs disposed in the midchord region having trip strips in the front serpentine passage but not in the rear serpentine passage. Another feature is the height of the trip strips in the legs of each passage which is unchanged for most legs over the length of the leg. Another feature is the pitch of the trip strips in the legs of each passage which is unchanged for most legs over the length of the leg. Still another feature is the variation in the trip strips from leg to leg and the heat transfer effectiveness of the legs which increases sequentially in the downstream direction. Still another feature is the angular orientation of the trip strips which forms an acute angle with the adjacent structure bounding each serpentine passage. Another feature in one embodiment is the angular orientation of the trip strips in the third passage which form an acute angle on the upstream side of the trip strip with the rib of the front serpentine passage.

A primary advantage of the present invention is the cost of the airfoil which results from the ease of inspection and manufacture of the coolable airfoil having relatively constant height and constant pitch trip strips in most legs of the cooling passages for the airfoil. Another advantage is the durability of the airfoil under operative conditions which results from acceptably cooling the leading edge region and the trailing edge region of the airfoil while shifting some of the cooling load from the midchord region to the front serpentine passage and bolstering cooling of the region cooled by the front serpentine passage with a leading edge passage.

The foregoing features and advantages of the present invention will become more apparent in light of the following detailed description of the invention and the accompanying drawings.

DETAILED DESCRIPTION OF THE INVENTION

Figure 1:
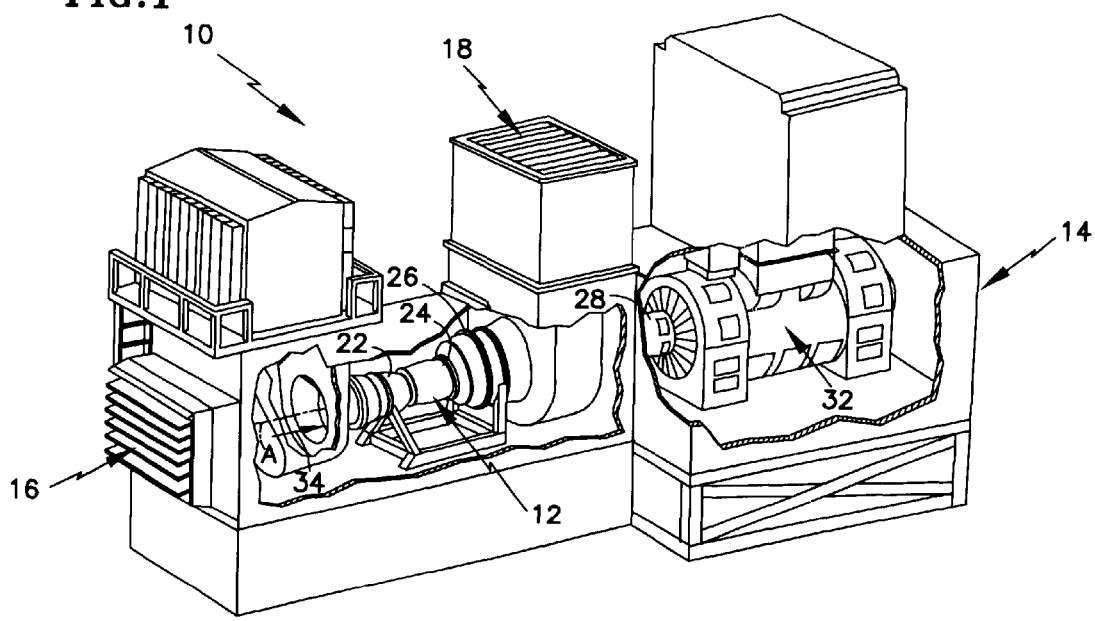
FIG. 1 is a schematic, perspective view partially broken away to show an industrial gas turbine engine in the installed condition.

FIG. 1 is a schematic, perspective view partially broken away to show an installation 10 of an industrial gas turbine engine 12. The installation includes a housing, as represented by the building 14, having an inlet for air 16 into the building and an outlet 18 for exhausted working medium gases from the building.

The industrial gas turbine engine 12 has a compression section 22, a combustion section 24, and a turbine section 26 which includes a free turbine (not shown). The industrial gas turbine engine has a rotor assembly having a shaft (not shown) disposed about an axis A. The shaft transmits energy to the compression section and exhausts gases to the free turbine to drive the free turbine. The free turbine is connected by a second shaft 28 to a machine, such as an electrical generator 32, to transmit rotational, mechanical energy to the generator.

A flow path 34 for working medium gases extends through the compression section 22, the combustion section 24 and the turbine section 26. Working medium gases in the form of air are flowed into the compression section where the gases are compressed. A large portion of the compressed working medium gases (air) is flowed to the combustion chamber. The air is mixed with fuel in the combustion chamber and burned to add energy to the gases. The hot, high-pressure working medium gases are expanded through the turbine section to drive the rotor assembly for compressing gases in the compression section and exhausted to drive the free turbine. A smaller portion of the compressed working medium gases (air) is flowed from the compression section to the turbine section for cooling critical components in the turbine section.

Figure 2:
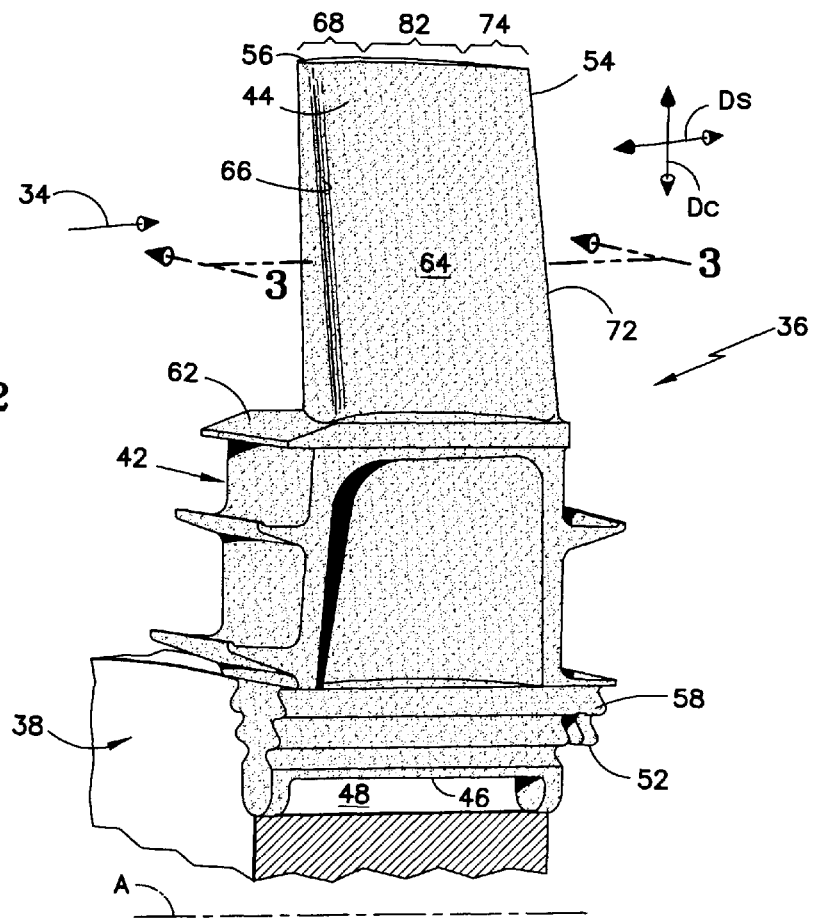
FIG. 2 is a perspective view of a rotor assembly for the industrial gas turbine engine FIG. 1 with part of the rotor assembly broken away to show a portion of a rotor disk and a coolable rotor blade.

FIG. 2 is a perspective view of a portion of the rotor assembly 36 for the industrial gas turbine engine 12 shown in FIG. 1. The rotor assembly includes a rotor disk 38 and a rotor blade 42 which engages the rotor disk. The rotor blade has an exterior 44 and an interior 46. The coolable rotor blade has a spanwise direction Ds and a chordwise direction Dc. The coolable rotor blade extends into the hot working medium flowpath 34 under operative conditions.

Cooling air is flowed from the compression section 22 to a source of cooling air, as represented by the cooling air supply region 48, for the coolable rotor blade 42. The interior 46 is adapted to receive the cooling air to provide cooling to the rotor blade to keep the working temperature of the rotor blade within acceptable limits for the material that is used to form the rotor blade.

The coolable rotor blade has an inner end 42 and an outer end 54. The rotor blade has a tip region 56 at the outer end of the rotor blade. A root 58 at the inner end of the rotor blade adapts the rotor blade to engage the rotor disk. The rotor blade includes a platform 62 and an airfoil 64 which extends outwardly from the platform. The airfoil has a radially oriented stacking line (not shown) which is perpendicular to the axis A of the engine. The airfoil is formed of a plurality of chordwise extending airfoil sections which are disposed about the stacking line.

The airfoil 64 has a leading edge 66 and a leading edge region 68 which extends rearwardly from the leading edge. The airfoil has a trailing edge 72 and a trailing edge region 74 which extends forwardly from the trailing edge. The trailing edge region is spaced chordwise from the leading edge region. The airfoil includes a suction sidewall 76 and a pressure sidewall 78 which each extend from the leading edge region to the trailing edge region. The airfoil has a midchord region 82 which extends chordwise and spanwise between the leading edge region and the trailing edge region.

Figure 3:
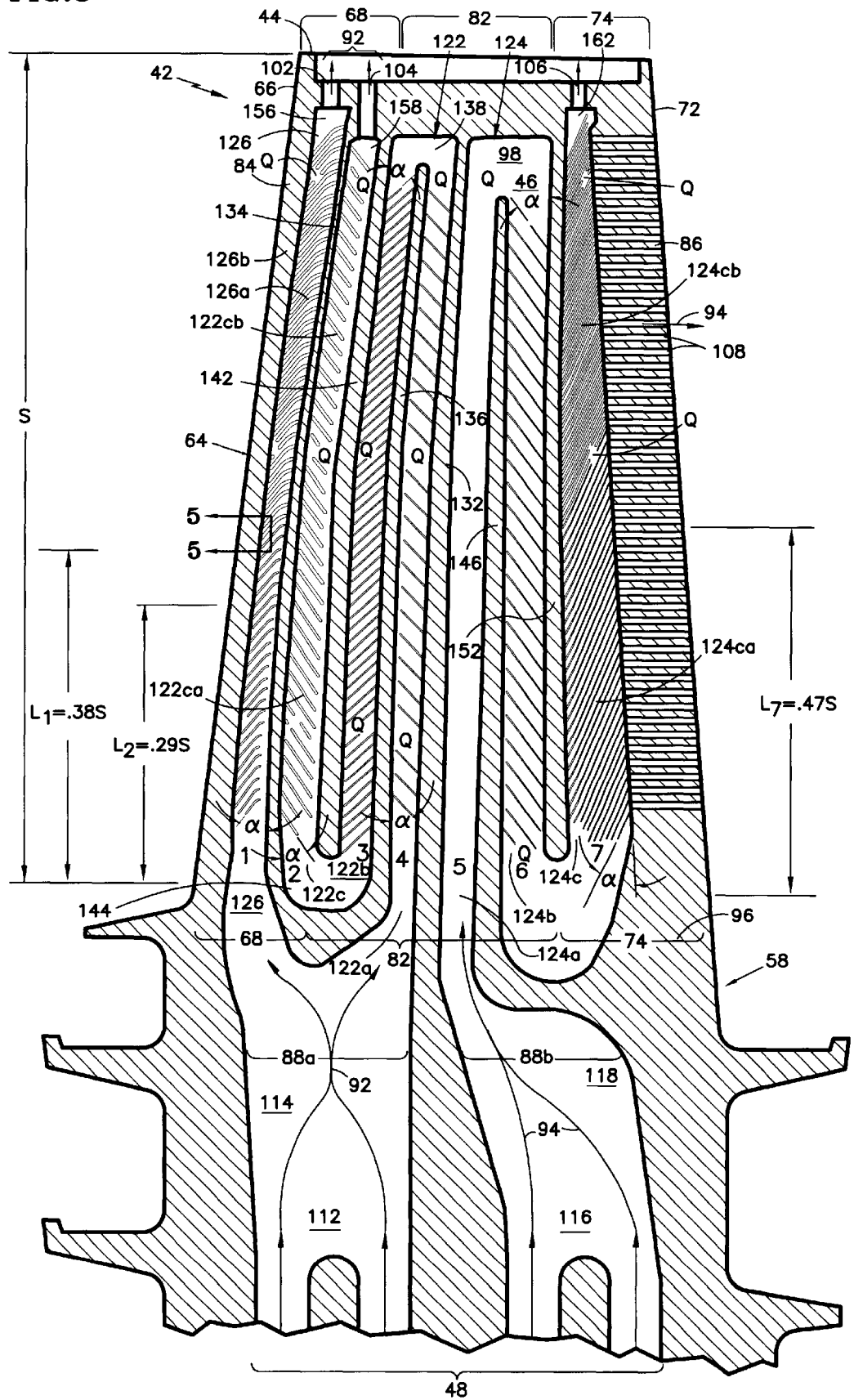
FIG. 3 is a side elevation view of the rotor blade shown in FIG. 2 which is broken away to show the interior of the rotor blade.

FIG. 3 is a side elevation view of the rotor blade 42 shown in FIG. 2 which is broken away to show the interior 46 of the rotor blade. The pressure sidewall 78 is joined to the suction sidewall 76 at the leading edge region 68 to form a spanwise extending airfoil structure, as represented by the leading edge wall 84. The pressure sidewall is joined to the suction sidewall at the trailing edge region to form a spanwise extending airfoil structure, such as the trailing edge wall 86. The pressure sidewall is spaced in a chordwise plane from the suction sidewall leaving a cavity 88 therebetween for receiving cooling air from the supply region.

The rotor blade 42 has a front flowpath 92 for cooling air and a rear flowpath 94 for cooling air. The root 58 has a chordwise extending root wall 96 through which these flowpaths extend. The tip region 56 has a tip wall 98. A plurality of openings in the tip wall, as represented by the openings 102, 104, 106, place the cooling air cavity 88 on the interior of the rotor blade in flow communication with the exterior 44 of the airfoil 64. The trailing edge wall also has a plurality of cooling holes 108 which extend in a generally chordwise direction through the trailing edge wall to place the cavity in flow communication with the exterior of the airfoil;

As shown in FIG. 3, the root has a first cooling air duct 112 which adapts the blade to be in fluid communication with the compression section 22 via the supply region 48. The first cooling air duct has a first plenum 114, a first cross-sectional flow area upstream of the first plenum and a second cross-sectional flow area for the first plenum which is greater than the first cross-sectional flow area. The root also has a second cooling air duct 116 which also adapts the rotor blade to be in fluid communication with the source of cooling air. The second cooling air duct has a second plenum 118, a first cross-sectional flow area upstream of the second plenum and a second cross-sectional flow area for the second plenum which is greater than the first cross-sectional flow area. The supply region supplies cooling air to both flowpaths at the same pressure. In an alternate embodiment, the supply region might have a front portion and a rear portion separated from each other and supplied with cooling air from the compression section at different pressures.

Figure 4:
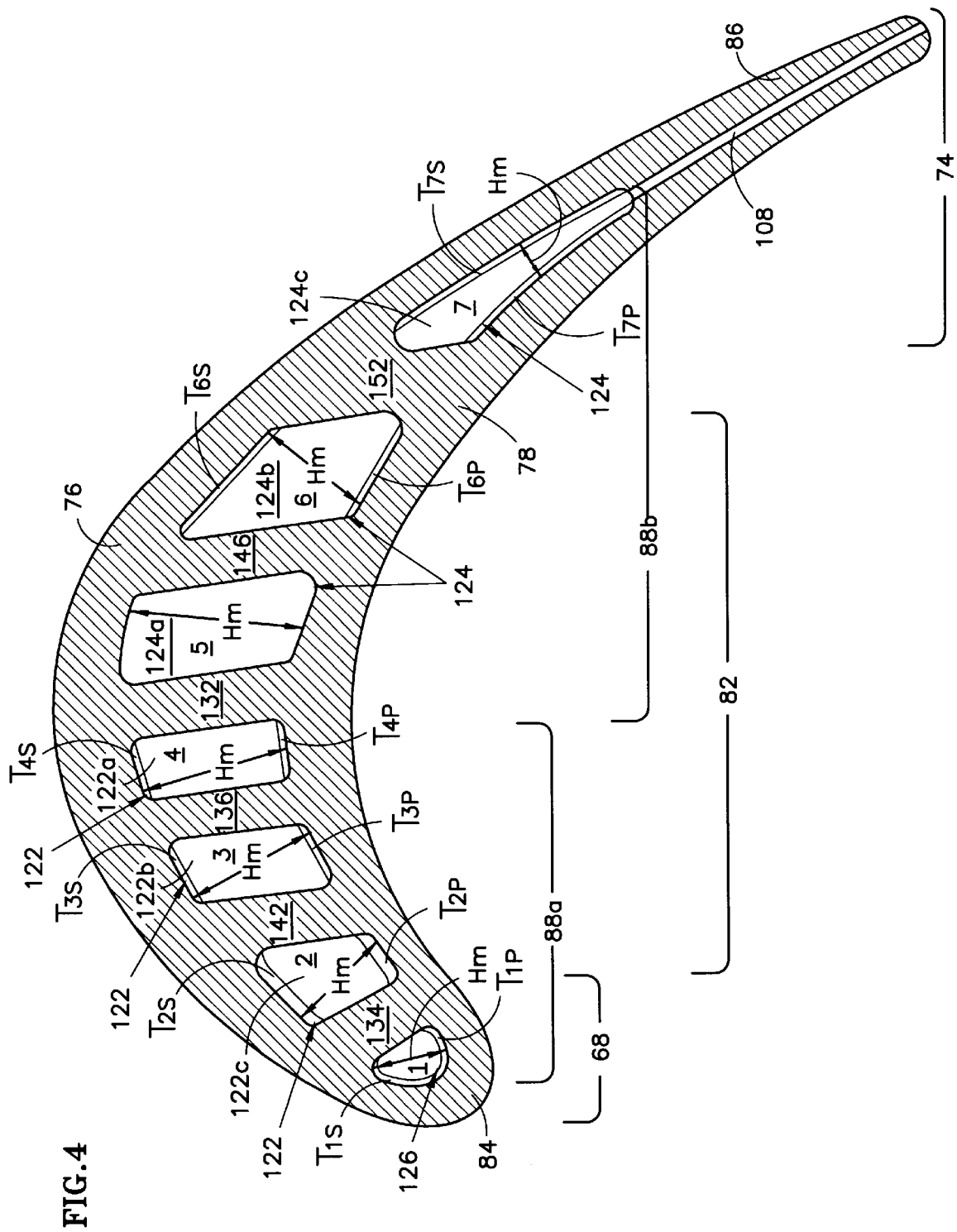
FIG. 4 is a cross-sectional view taken along the lines 4—4 of FIG. 3 at about the forty (40) percent span of the airfoil showing a front serpentine passage, a rear serpentine passage and a third leading edge passage and showing the minimum height of the passage as measured in a chordwise extending plane.

FIG. 4 is a cross-sectional view taken along the lines 4—4 of FIG. 3 at about the 40 percent span S (L1=0.38S) of the airfoil. As shown in FIG. 3 and FIG. 4, the rotor blade has a front serpentine passage 122, a rear serpentine passage 124 and a third leading edge passage 126. FIG. 4 shows the minimum height Hm of the passage as measured at different chordwise locations (numbered 1–7). The minimum height is measured in a chordwise extending plane and at the different locations for the serpentine passages and the third leading edge passage. The minimum height Hm is measured perpendicular to the suction sidewall 76 and from the suction sidewall to the pressure sidewall 78. The passages have trip strips T whose height is exaggerated for purposes of illustration.

The airfoil has ribs, as represented by the ribs set forth below, which extend spanwise from the suction sidewall 76 to the pressure sidewall 78 to form spanwise airfoil structures adjacent to the serpentine passages. These ribs chordwise bound the serpentine passages. In addition, the leading edge wall 84 adjacent the leading edge passage 126 and the trailing edge wall 86 adjacent the rear serpentine passage 124 are also adjacent airfoil structures which chordwise bound the associated passage. Each of the serpentine passages has three legs (that is, 122a, b, c for the first serpentine passage and 124a, b, c for the second serpentine passage). Each leg extends spanwise and is bounded by ribs as set forth below.

A first rib 132 extends in the spanwise direction in the midchord region 82 to the tip wall 98 to divide the cavity 88 into a front portion 88a and a rear portion 88b. The front portion has a second rib 134 which extends from the root wall 96 to the tip wall 98 and is spaced from the leading edge 66 leaving the third leading edge passage 126 therebetween. The third leading edge passage has a single leg which is in flow communication with the first cooling air duct 112.

A third rib 136 extends from the root wall 96. The third rib is spaced chordwise from the first rib 132 leaving the first leg 122a of the front serpentine passage 122 therebetween. The third rib bounds the second leg 122b. The third rib is spaced spanwise from the tip wall 98 leaving a first turn region when 138 therebetween which connects the first leg to the second leg.

A fourth rib 142 extends spanwise from the tip wall. The fourth rib is spaced chordwise from the third rib 136 to bound the second leg 122b. The fourth rib is spaced chordwise from the second rib 134 to leave the third leg 122c therebetween. The fourth rib is spaced spanwise from the root wall leaving a second turn region 144 therebetween for the front serpentine passage 122.

The rear portion 88b of the cavity has a fifth rib 146 which extends from the root wall 96. The fifth rib is spaced chordwise from the first rib leaving the first leg 124a of the rear serpentine passage 124 therebetween. The fifth rib bounds the second leg 124b. The fifth rib is spaced spanwise from the tip wall 98 leaving a first turn region 148 therebetween which connects the first leg to the second leg for the rear serpentine passage.

The rear portion has a sixth rib 152 which extends spanwise from the tip wall 98. The sixth rib is spaced chordwise from the fifth rib to bound the second leg 124b. The sixth rib is spaced chordwise from the trailing edge wall 86 to leave the third leg 124c therebetween. The sixth rib is also spaced spanwise from the root wall 96 leaving a second turn region 154 therebetween for the rear serpentine passage.

The front serpentine passage 122, the rear serpentine passage 124 and the third leading edge passage 126 each have a passage end, as represented by the passage ends 158, 162, 156. Each passage end is in flow communication with an associated exhaust opening 104, 106, 102 which extends through the tip region 56 of the airfoil 64 to the exterior 44 of the airfoil. The exhaust opening places the end of the associated passage in flow communication with the exterior of the airfoil.

The front serpentine passage 122, the rear serpentine passage 124 and the third leading edge passage 126 each have at least one array of trip strips Ts on the suction sidewall and at least one array of trip strips Tp on the pressure sidewall to form at least two arrays of trip strips for each passage. In the embodiment shown, the front serpentine passage has an array of trip strips on the suction sidewall and the pressure sidewall of each leg. The array extends for substantially (over 90 percent) the entire length of the leg, but maybe shorter and realize some of the benefits of this invention. Thus, the first leg 122a has an array of pressure sidewall trip strips T4p and an array of suction sidewall trip strips T4s. The second leg 122b has array of an array of pressure sidewall trip strips T3p and an array of suction sidewall trip strips T3s. The third leg 122c has an array of pressure sidewall trip strips T2p and an array of suction sidewall trip strips T2s. The third leg has an inner portion 122ca and an outer portion 122cb of the array of trip strips where the arrays are different in some characteristics from the inner portion.

The rear serpentine passage does not have arrays of trip strips in the first leg. The second leg and third leg each have arrays of trip strips. Thus, the second leg has an array of pressure sidewall trip strips T6p and an array of suction sidewall trip strips T6s. The third leg has an array of pressure sidewall trip strips T7p and an array of suction sidewall trip strips T7s. The third leg has an inner portion and an outer portion of the array of trip strips which is different in some characteristics from the inner portion.

The trip strips T of each sidewall 76, 78 are spaced spanwise one from the other with a pitch and are spaced spanwise from the trip strips on the other wall. Each trip strip has an upstream side and a downstream side with reference to the associated flow path for cooling air and the sidewall from which it extends. For example, a trip strip in the passage 122b has a trip strip T3 on the suction sidewall (T3s) having an upstream side (T3su) and a downstream side (T3sd). The trip strips of each array are parallel one to the other and parallel to the trip strips of the facing sidewall. Each trip strip has a height H measured from the adjacent portion of the sidewall, commonly referred to as "e," and a trip strip height to pitch ratio (e/p). The height to pitch ratio may be normalized by multiplying the height to pitch ratio by one hundred (100). Each trip strip forms an acute angle of about forty-five (45) degrees on the upstream side with the adjacent spanwise airfoil structure that bounds the serpentine passage.

The trip strips of each array may be removed in certain locations of the array to provide for the measurement of wall thickness in parts that are manufactured. This enables inspection of the airfoil for quality control. These regions are marked by the locations Q. The removal of part of a trip strip or entire trips trip for this purpose is not considered to change the pitch of the array of trip strips. Typically, removal of all or part of a trip strip for this quality control purpose will occur at three locations of each sidewall on each leg.

The following table sets forth for one embodiment of the present invention the relationship of trip strip height (mils), trip strip pitch, and the normalized ratio of trip strip height of trip strip pitch multiplied by 100 adjacent the radially inner and radially outer portions of each array of trip strips. The following table also sets forth the minimum height Hp between the suction sidewall and the pressure sidewall measured with respect to the axial direction as measured at about the 40% span location (Ls=0.38S).

| | Root | | | | Tip | | |
|---|---|---|---|---|---|---|---|
| Chord Location | T Height mils | T Pitch mils | e/p × 100 | e/p | T Height mils | T Pitch mils | Hm mils |
| 1 | 10 | 100 | 10 | 20 | 20 | 100 | 264 |
| 2 | 15 | 150 | 10 | 20 | 30 | 150 | 382 |
| 3 | 10 | 100 | 10 | 10 | 10 | 100 | 472 |
| 4 | 10 | 200 | 5 | 5 | 10 | 200 | 527 |
| 5 | 0 | 0 | — | — | 0 | 0 | 601 |
| 6 | 10 | 200 | 5 | 5 | 10 | 200 | 411 |
| 7 | 10 | 100 | 10 | 20 | 15 | 75 | 151 |

Figure 5:
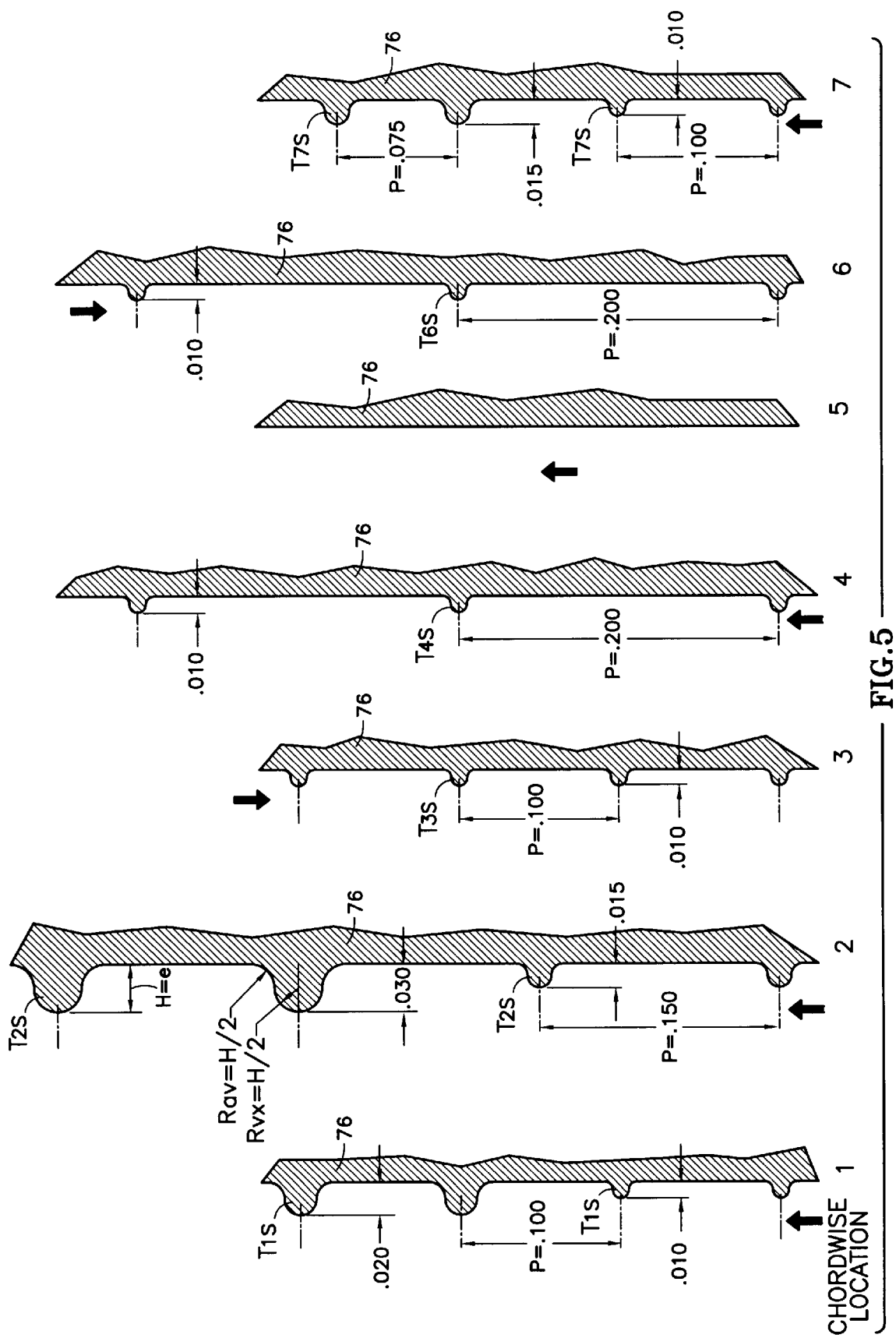
FIG. 5 is a schematic, cross-sectional view of a portion of the serpentine passages showing an array of trip strips adjacent each leg of the passages at selected span locations on the airfoil with the remainder of the airfoil broken away for simplicity.

FIG. 5 is a schematic, cross-sectional view of a portion of the serpentine passages showing an array of trip strips adjacent each leg of the passages at selected span locations on the airfoil with the remainder of the airfoil broken away for simplicity. One portion is a cross-sectional view taken along the lines 5—5 of FIG. 3 with portions of the rotor blade broken away at about the forty (40) percent span (S=0.38) of the airfoil for chordwise location 1, 3, 4 and 5; at about thirty percent span (S=0.29) for chordwise location 2; and, at about 50 percent span for chordwise location 7 (S=0.47).

As shown in FIG. 5, each trip strip has a convex cylindrical top portion having a radius equal to one-half of the height of the trip strip (Rvx=H/2=e/2) and a concave upstream side T3su and downstream side T3sd forming a cylindrical transition to the sidewall having a radius equal to one-half of the height of the trip strip (Rav=H/2=e/2). The height H (e) of the trip strips in the first, second and third passage lies in a range of about ten (10) mils to about thirty (30) mils (10<=height, e, H=<30).

Figure 6:
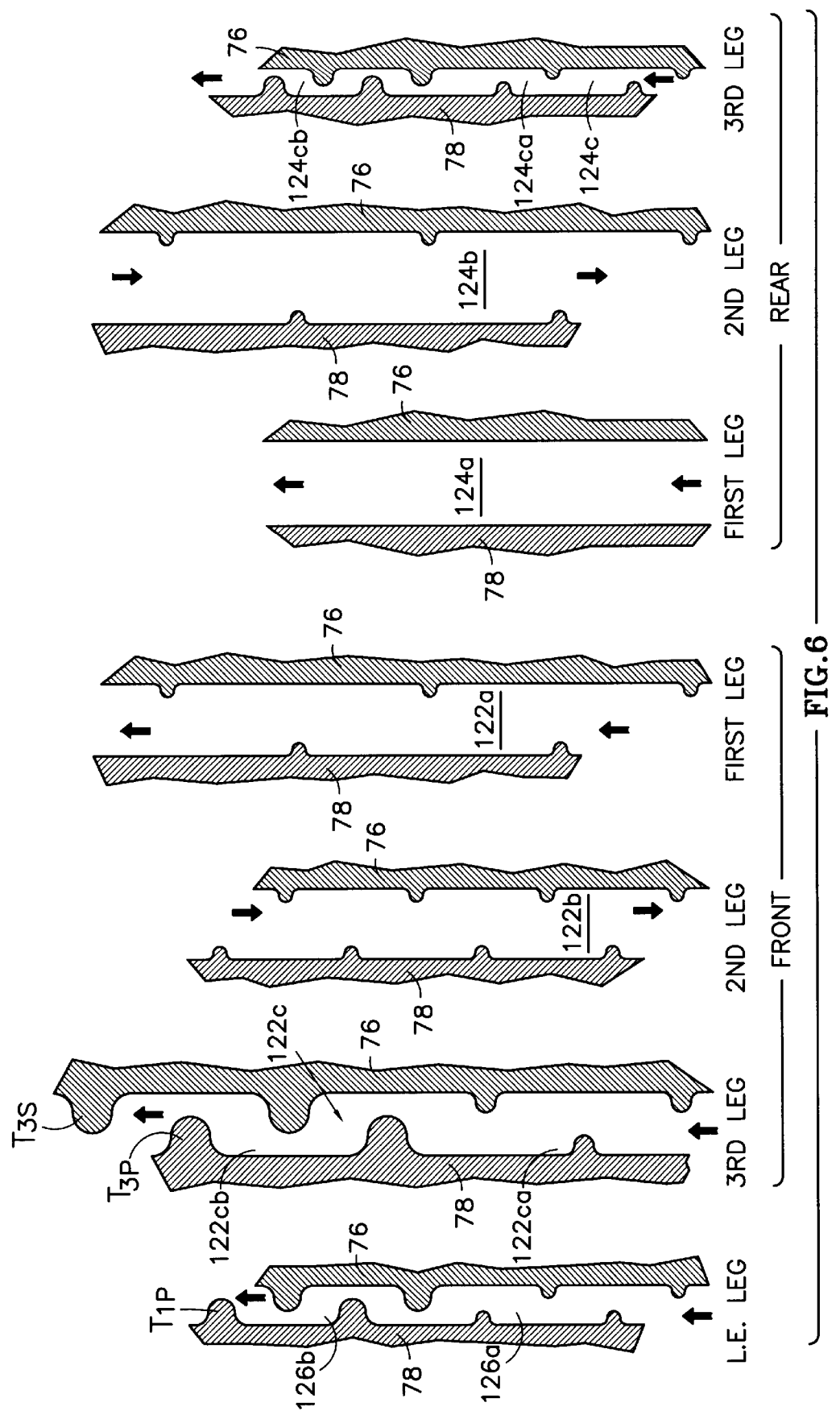
FIG. 6 is a schematic, cross-sectional view of the portions of the passages shown in FIG. 5 to show approximately the relative height of the trip strips to the minimum height of the passage.

FIG. 6 is a schematic, cross-sectional view of the portions of the passages shown in FIG. 5 to show schematically the relative height of the trip strips to the minimum height of the passage and the pitch of the trip strips.

Figure 7:
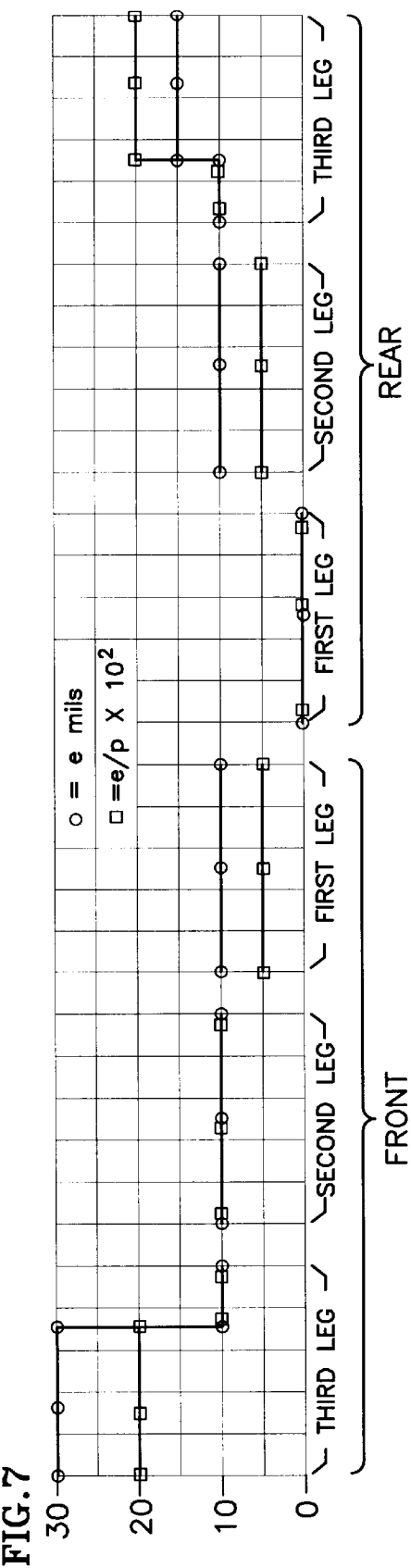
FIG. 7 is a graphical representation of trip strip height in mils and the non-dimensional trip strip height to pitch ratio multiplied by 100 for the serially connected legs of the front serpentine passage and the rear serpentine passage.

FIG. 7 is a graphical representation of trip strip height in mils and the non-dimensional trip strip height to pitch ratio (e/p) normalized by multiplying by 100 for the serially connected legs 122a, 122b, 122c of the front serpentine passage and for the serially connected legs 124a, 124b, 124c the rear serpentine passage.

Figure 8A:
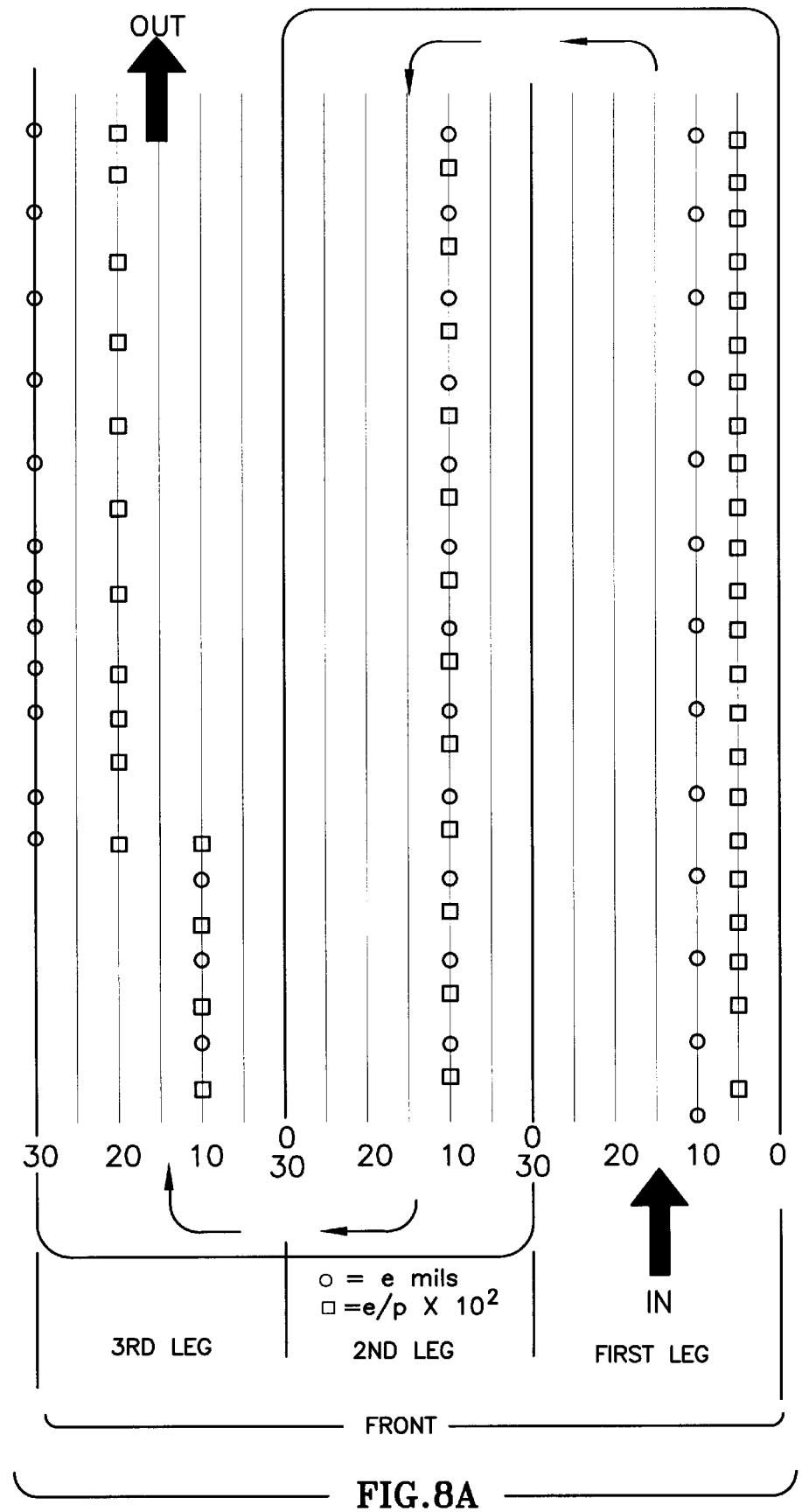
FIG. 8A and FIG. 8B are graphical representations of the front serpentine passage and the rear serpentine passage similar to the graphical representation shown in FIG. 7, showing the three legs of each passage adjacent to each other and graphically representing the trip strip height in mils and the non-dimensional height to pitch ratio multiplied by 100.
Figure 8B:
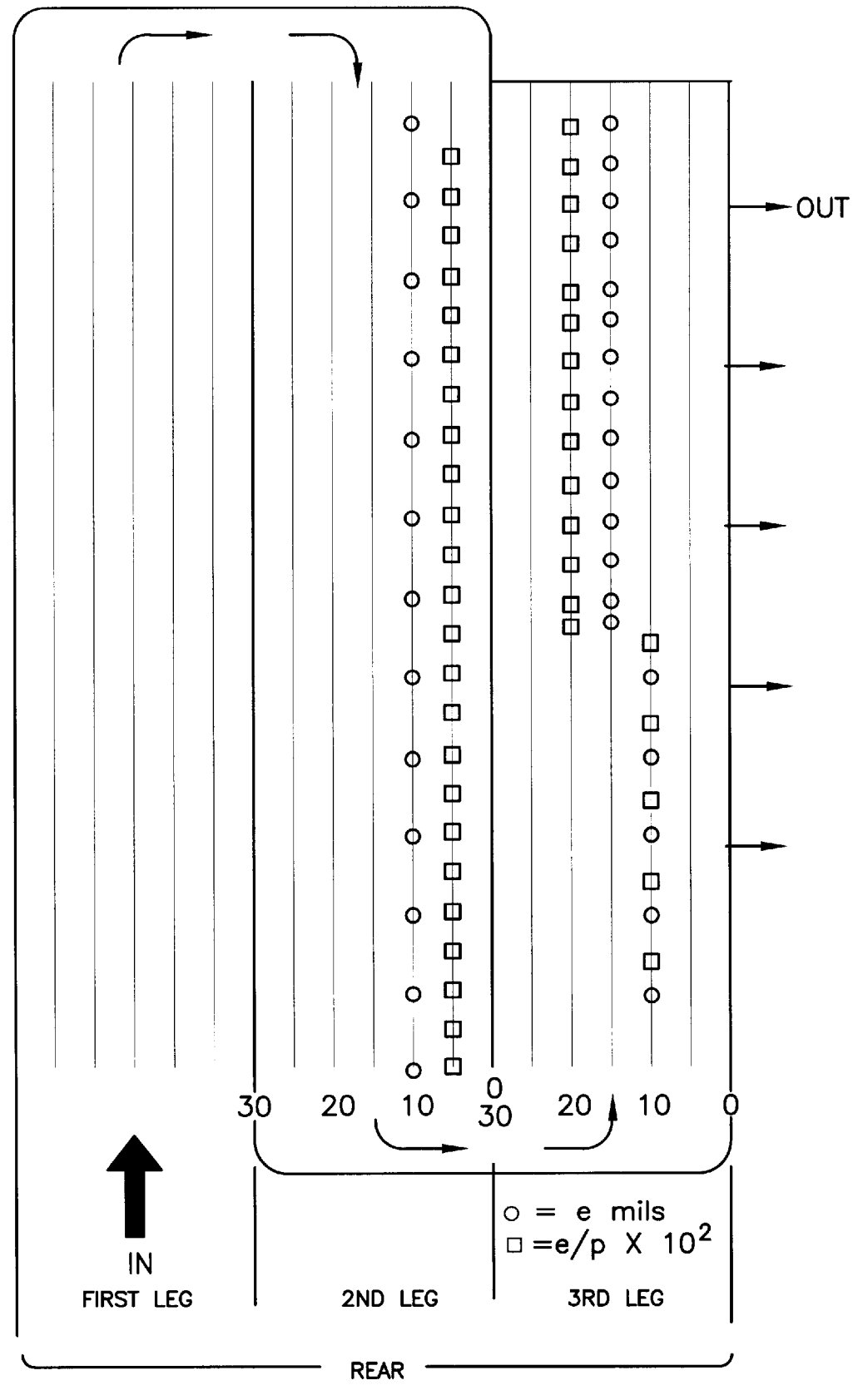

FIG. 8A and FIG. 8B are graphical representations of the front serpentine passage and the rear serpentine passage similar to the graphical representation shown in FIG. 7, showing the three legs of each passage adjacent to each other and graphically representing the trip strip height in mils and the non-dimensional height to pitch ratio multiplied by 100.

Figure 9:
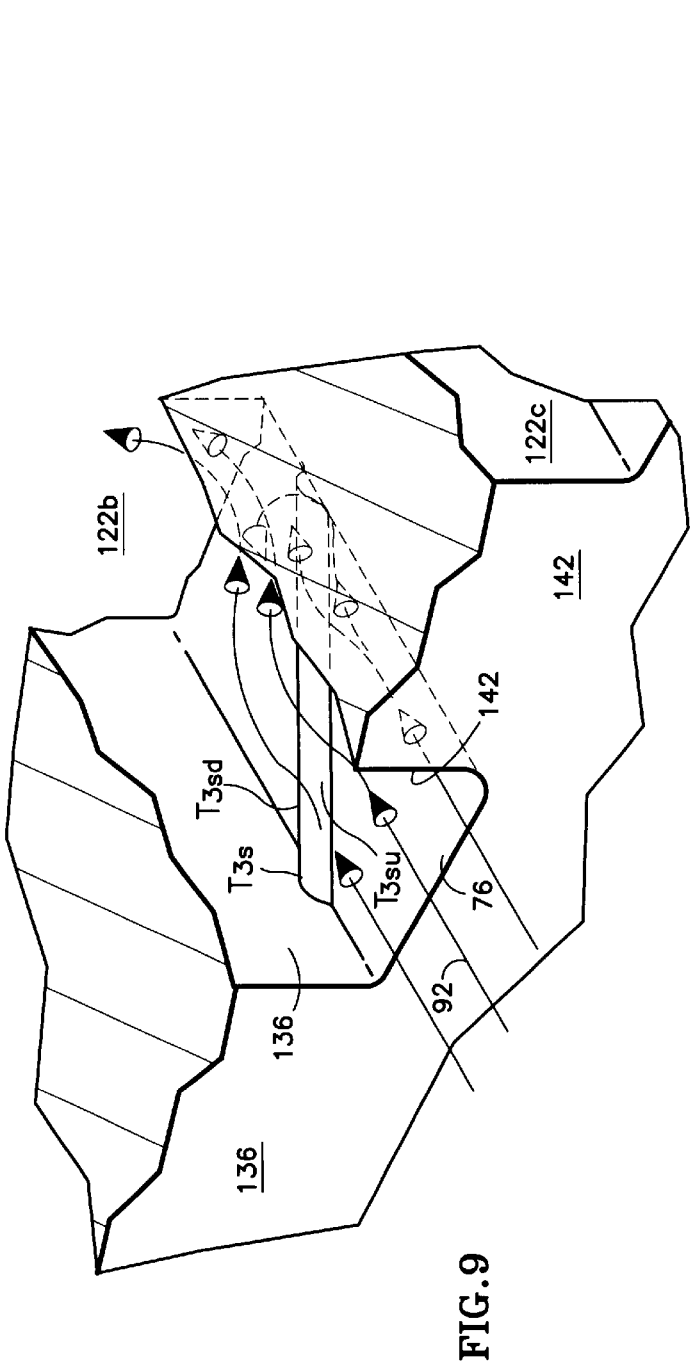
FIG. 9 is a schematic, partial perspective view of a portion of one of the passages looking downstream with respect to the flowpath for cooling air to show the relationship of a trip strip to the adjacent structure of the airfoil and to the flowpath cooling air.

FIG. 9 is a schematic, partial perspective view of a portion of one of the passages to show the relationship of a trip strip to the adjacent structure of the airfoil and to the flowpath cooling air. As shown in FIG. 9, the trip strip is at an acute angle on the upstream side to the rib closest to the edge region to drive a portion of the cooling air toward the rib and into the passage with a counterclockwise movement of the flow. This increases turbulence in the passage and promotes heat transfer from the rib closest to the edge region of the airfoil.

During operation of the gas turbine engine, the coolable rotor blade receives heat from the working medium flow path. The heat flux is higher for the leading edge region and for the thinner trailing edge region than for the midchord region. Cooling air is flowed to the midchord region through the front serpentine passage 122 and the rear serpentine passage 124.

The first leg 122a of the front serpentine passage has trip strips but the first leg 124a of the rear serpentine passage does not. The front serpentine passage removes more heat from the midchord region than does the rear serpentine passage. As a result, the rear serpentine passage experiences less interference with its flow and with the pressure that is available to push the flow through the third leg 124c of the rear serpentine passage. This is important because the third leg of the rear serpentine passage has a smaller flow area than the third leg of the front serpentine passage. In addition, because there were no trip strips in the first leg, the cooling air is not heated as much as the cooling air in the front serpentine passage. As a result, the cooling air in the rear serpentine passage has an enhanced capability to remove heat from the trailing edge region as compared to cooling air at a higher temperature that encountered trip strips in the first leg of the rear serpentine passage. Thus, the design ensures heat removal from the midchord region while enhancing the pressure capability and temperature of the cooling air for cooling the critical trailing edge region.

The arrays of trip strips in the legs of the front serpentine passage and the rear serpentine passage that are disposed in the first leg 122a and the second leg 122b, 124b each have no increase in the trip strip height and trip strip height to pitch ratio for the associated leg and over the entire leg. This design simplifies preparation of dies used in fabrication of the rotor blade and increases the ease of inspection during manufacture of the airfoil.

The front serpentine passage 122 and the rear serpentine passage 124 in the third leg 122c, 124c of each passage have trip strips with both a trip strip height and trip strip height to pitch ratio over at least a portion of the third leg 122cb, 124cb which is greater than that of the second leg 122b, 124b. This provide a greater increase in heat transfer effectiveness of the third leg over the second leg than exists between the second leg and the first leg as the flow of cooling air proceeds in the downstream direction.

In addition, the front serpentine passage and the rear serpentine passage in the third leg of each passage have arrays of trip strips for the third leg which are disposed in the second portion 122cb, 124cb that have a trip strip height and a trip strip height to pitch ratio which is greater than that in the first portion 122ca, 124ca and greater than that of the corresponding array in the second leg 122b, 124b. The arrays of trip strips in the second leg have a trip strip characteristic selected from the group consisting of trip strip height or trip strip height to pitch ratio which is greater than that of the corresponding trip strip characteristic of the first leg to sequentially increase the heat transfer effectiveness of the second and third legs in the downstream direction. Accordingly, the design balances the need to transfer more heat from the leading edge region with the need to remove a smaller amount of heat from the midchord region.

The third passage 126 disposed between the leading edge 66 and the third leg 122c of the front serpentine passage has a first portion 126a adjacent to the root 58 and a second portion 126b adjacent to the tip region 56. The third passage has a trip strip height e and trip strip height to pitch ratio (e/p) which is greater than that of the first portion. The third passage supplements the removal of heat from the front serpentine passage in the leading edge region 68. This heat transfer capability supplements the heat transfer capability on the front serpentine passage which received more heat from the midchord region as result of trip strips in the first leg as compared to a design that had no trip strips in the first leg. Thus, the heat transfer capacity of the lower temperature cooling air of the rear serpentine passage was enabled by the front serpentine passage and to some extent by the third passage.

As represented in FIG. 9, the arrays of trip strips in the legs of the front serpentine passage and the rear serpentine passage form an acute angle on the upstream side of the trip strip with the spanwise airfoil structure bounding the passage that is closest to the associated edge region. This drives a portion of cooling air flow in the first flowpath toward such structure which is closest to the associated edge of the airfoil under operative conditions. Again, this biases the heat transfer capability toward the edge regions of the airfoil. The third passage 126 disposes the trip strips so that each trip strip forms an acute angle on the upstream side of the trip strip with the second rib for driving a portion of cooling air flow toward the forwardmost rib bounding the first serpentine passage under operative conditions. Again, the heat transfer capability of the third passage is supplementing the heat transfer capability of the first serpentine passage in the leading edge region 68.

Although the invention has been shown and described with respect to detailed embodiments thereof, it shoud be understood by those skilled in the art that various changes in form and detail may be made without departing from the spirit and scope of the claimed invention.

I claim:

1. A coolable rotor blade for an industrial gas turbine engine which has a front flowpath for cooling air and a rear flowpath for cooling air, an airfoil having a leading edge region, a trailing edge region and a midchord region disposed between the leading edge region and the trailing edge region, the airfoil having a suction sidewall and a pressure sidewall which are joined at the leading edge region and at the trailing edge region and spaced apart leaving a cavity therebetween through which at least a portion of the flowpaths for cooling air extend, a front serpentine passage and a rear serpentine passage extending in the cavity which each have an upstream direction and a downstream direction, which each are bounded by the suction sidewall, by the pressure sidewall, and by adjacent airfoil structure extending spanwise and between the walls, each serpentine passage having a first spanwise leg, a second spanwise leg and a third spanwise leg serially connected such that the associated portion of the flowpath extends through the legs for serially flowing a stream of cooling air under operative conditions from the midchord region through the first leg to the third leg in one of said edge regions of the airfoil from which third leg the stream of cooling air is discharged under operative conditions, which comprises:

at least one array of trip strips on the suction sidewall and at least one array of trip strips on the pressure sidewall bounding the front serpentine passage, at least one array of trip strips on the suction sidewall and at least one array of trip strips on the pressure sidewall bounding the rear serpentine passage, the arrays of trip strips forming at least two arrays of trip strips for each passage, the trip strips of each array on each sidewall being spaced spanwise one from the other with a pitch and spaced spanwise from and substantially parallel to the adjacent trip strips of the array on the other wall, each trip strip extending into a leg of the associated passage and having a height measured from the adjacent portion of the sidewall and a trip strip height to pitch ratio for that leg, wherein each leg of each serpentine passage which is downstream of another leg has a trip strip height to pitch ratio over at least a portion of the leg which is greater than that of the preceding leg to increase the heat transfer effectiveness of each downstream leg over that of the upstream leg as the cooling air in either serpentine passage moves closer to the associated edge region of the airfoil under operative conditions and wherein the pitch for each of the arrays of trip strips in each leg having trip strips is constant, except for the third leg of the rear serpentine passage, to promote ease of manufacture and inspectability while providing heat removal that emphasizes the edge regions over the midchord region.

2. The coolable rotor blade for an industrial gas turbine engine of claim 1, wherein the first, second, and third legs of the front serpentine passage each have array of trip strips and wherein the second leg and third leg of the second serpentine passage each have arrays of trip strips.

3. The coolable rotor blade for an industrial gas turbine engine of claim 1 wherein the airfoil further has a leading edge and a trailing edge, wherein each trip strip has an upstream side, wherein the spanwise airfoil structure bounding each serpentine passage has a portion that is closest to the associated edge region of the airfoil and wherein the arrays of trip strips in the legs of the front serpentine passage and the rear serpentine passage form an acute angle on the upstream side of each trip strip with said portion of the adjacent airfoil structure to drive a portion of the flowpath toward such structure to preferentially cool the edge regions of the airfoil under operative conditions.

4. The coolable rotor blade for an industrial gas turbine engine of claim 1, wherein the cooling air cavity has a front portion having the front serpentine passage and a rear portion having the rear serpentine passage, wherein the rotor blade has a root having a first cooling air duct through which the front flowpath for cooling air passes and which is in flow communication with the front portion of the cooling air cavity for supplying cooling air to the leading edge passage and the front serpentine passage, and having a second cooling air duct through which the rear flowpath for cooling air passes and which is in flow communication with the rear portion of the cooling air cavity for supplying cooling air to the rear serpentine passage and wherein each duct has an average cross-sectional area measured perpendicular to the associated flowpath at each location along the flowpath, and has an associated plenum which is adjacent the cavity and has an increase in average cross-sectional area as compared to the average cross-sectional area upstream of the plenum, and wherein the increase in cross-sectional area is adapted to reduce the velocity of the cooling air under operative conditions to increase the static pressure of the cooling air prior to entering the airfoil and reduces flow losses in the duct.

5. The coolable rotor blade for an industrial gas turbine engine of claim 1 wherein each trip strip has an upstream side, wherein the arrays of trip strips in the legs of the front serpentine passage and the rear serpentine passage form an acute angle on the upstream side of the trip strip with the spanwise airfoil structure bounding the passage which is closest to the associated edge region to drive a portion of cooling air flow toward such structure which is closest to the associated edge of the airfoil under operative conditions.

6. The coolable rotor blade for an industrial gas turbine engine of claim 1 wherein each trip strip has a convex cylindrical top portion having a radius equal to one-half of the height of the trip strip and a concave upstream side and downstream side forming a cylindrical transition to the sidewall having a radius equal to one-half of the height of the trip strip.

7. The coolable rotor blade for an industrial gas turbine engine of claim 1 wherein the height e of the trip strips in the first, second and third passage lies in a range of about ten (10) mils to about thirty (30) mils (10<=height=<30).

8. The coolable rotor blade for an industrial gas turbine engine of claim 1 wherein the airfoil further has a leading edge and a trailing edge, wherein a third leading edge passage extends spanwise and is disposed chordwise between the leading edge and the front serpentine passage, wherein the front flowpath for cooling air divides to provide part of the first flowpath to the front serpentine passage and part of the first flowpath to the third leading edge passage, wherein the third passage has at least one array of trip strips on the suction sidewall and at least one array of trip strips on the pressure sidewall to form at least two arrays of trip strips for the third passage, the trip strips of each sidewall being spaced spanwise one from the other with a pitch that is constant and spaced spanwise from and parallel to the trip strips on the other wall.

9. The coolable rotor blade for an industrial gas turbine engine of claim 8 wherein the rotor blade has a root and a tip, wherein each trip strip of the third passage has a height measured from the adjacent portion of the sidewall and a trip strip height to pitch ratio and wherein the third passage has a first portion adjacent to the root and a second portion adjacent to the tip and wherein the second portion has a trip strip height and trip strip height to pitch ratio which is greater than that of the first portion.

10. The coolable rotor blade for an industrial gas turbine engine of claim 1 wherein the airfoil further has a leading edge and a trailing edge, wherein a third passage is disposed between the leading edge and the third leg of the front serpentine passage, wherein each trip strip has an upstream side, and wherein each trip strip forms an acute angle on the upstream side of the trip strip with the adjacent stator structure bounding the third leg for driving a portion of cooling air flow toward that portion of the spanwise airfoil structure bounding the serpentine passage which is closest to the associated edge region to drive a portion of cooling air flow toward such structure under operative conditions.

11. The coolable rotor blade for an industrial gas turbine engine of claim 7 wherein the arrays of trip strips in the legs of the front serpentine passage and a rear serpentine passage form an acute angle on the upstream side of the trip strip with the spanwise airfoil structure bounding the passage which is closest to the associated edge region to drive a portion of cooling air flow toward such structure which is closest to the associated edge of the airfoil under operative conditions.

12. The coolable rotor blade for an industrial gas turbine engine of claim 8 wherein the rotor blade has an interior and exterior, wherein the airfoil has a tip region and wherein the front serpentine passage, the rear serpentine passage and the third leading edge passage each have an end in the tip region and an exhaust opening which extends through the tip region of the airfoil to the exterior of the airfoil to place the end of each passage in flow communication with the exterior of the airfoil and wherein the trailing edge region has a plurality of cooling holes which extend in a generally chordwise direction through the trailing edge region to place the third leg of the rear passage in flow communication with the exterior of the airfoil.

13. The coolable rotor blade for an industrial gas turbine engine of claim 1 wherein the third leg of the front serpentine passage and the third leg of the rear serpentine passage have an increased trip strip height as compared to the other legs of the associated passage over at least a portion of the third leg.

14. The coolable rotor blade for an industrial gas turbine engine of claim 13 wherein the front serpentine passage and the rear serpentine passage in the third leg of each passage have trip strips with both a trip strip height and trip strip height to pitch ratio over at least a portion of the third leg which is greater than that of the second leg to provide a greater increase in heat transfer effectiveness of the third leg over the second leg than exists between the second leg and the first leg as the flow of cooling air proceeds in the downstream direction.

15. The coolable rotor blade for an industrial gas turbine engine of claim 14 wherein the front serpentine passage and the rear serpentine passage in the third leg of each passage have a first portion which receives cooling air from the second leg and a second portion outwardly of the first portion, and wherein the arrays of the trip strips for the third leg which are disposed in the second portion have a trip strip height and a trip strip height to pitch ratio which is greater than that of the associated array in the first portion and greater than that of the corresponding array in the associated second leg and wherein the arrays of trip strips in the second leg have a trip strip characteristic selected from the group consisting of trip strip height or trip strip height to pitch ratio which is greater than that of the corresponding trip strip characteristic of the first leg to sequentially increase the heat transfer effectiveness of the second and third legs in the downstream direction.

16. The coolable rotor blade for an industrial gas turbine engine of claim 13 wherein the arrays of trip strips in the legs of the front serpentine passage and the rear serpentine passage that are disposed in the first leg and the second leg each have no increase in the trip strip height and trip strip height to pitch ratio for the associated leg over the entire span of the leg which increases the ease of inspection and fabrication during manufacture of the airfoil and does not increase the disturbance of the flow from one portion to the next portion of the leg.

17. The coolable rotor blade for an industrial gas turbine engine of claim 13 wherein the front serpentine passage and the rear serpentine passage in the third leg of each passage have a first portion which receives cooling air from the second leg and a second portion outwardly of the first portion, and wherein the arrays of the trip strips for the third leg which are disposed in the second portion have a trip strip height and a trip strip height to pitch ratio which is greater than that of the associated array in the first portion and greater than that of the corresponding array in the associated second leg and wherein the arrays of trip strips in the second leg have a trip strip characteristic selected from the group consisting of trip strip height or trip strip height to pitch ratio which is greater than that of the corresponding trip strip characteristic of the first leg to sequentially increase the heat transfer effectiveness of the second and third legs in the downstream direction.

18. The coolable rotor blade for an industrial gas turbine engine of claim 17 wherein the arrays of trip strips in the legs of the front serpentine passage and the rear serpentine passage that are disposed in the first leg and the second leg each have no increase in the trip strip height and trip strip height to pitch ratio for the associated leg over the entire span of the leg which increases the ease of inspection and fabrication during manufacture of the airfoil and does not increase the disturbance of the flow from one portion to the next portion of the leg.

19. The coolable rotor blade for an industrial gas turbine engine of claim 13 wherein the arrays of trip strips in the legs of the front serpentine passage and the rear serpentine passage that are disposed in the first leg and the second leg each have no increase in the trip strip height and trip strip height to pitch ratio for the associated leg over the entire span of the leg which increases the ease of inspection and fabrication during manufacture of the airfoil and does not increase the disturbance of the flow from one portion to the next portion of the leg.

20. A coolable rotor blade for an industrial gas turbine engine having a rotor assembly, the coolable rotor blade having an exterior, which comprises:
  a root which adapts the rotor blade to engage a portion of the rotor assembly, the root having
    a chordwise extending root wall,
    a first cooling air duct which adapts the blade to be in fluid communication with a source of cooling air, the first cooling air duct having a first plenum, a first cross-sectional flow area upstream of the first plenum and a second cross-sectional flow area for the first plenum which is greater than the first cross-sectional flow area, and
    a second cooling air duct which adapts the blade to be in fluid communication with a source of cooling air; the second cooling air duct having a second plenum, a first cross-sectional flow area upstream of the second plenum and a second cross-sectional flow area for the second plenum which is greater than the first cross-sectional flow area;
  an airfoil having a spanwise length S, having a front serpentine passage, having a rear serpentine passage, and having ribs which extend spanwise from the suction sidewall to the pressure sidewall to form spanwise airfoil structures which chordwise bound the passages, each serpentine passage having three legs which extend spanwise and which are bounded by the ribs, the airfoil having
    a leading edge, a leading edge region, and a trailing edge and a trailing edge region spaced spanwise from the leading edge region,
    a midchord region which extends chordwise and spanwise between the leading edge region and the trailing edge region,
    a suction sidewall and a pressure sidewall, the pressure sidewall being joined to the suction sidewall to form spanwise airfoil structure which chordwise bound an adjacent passage, the spanwise airfoil structure including a leading edge wall at the leading edge region and a trailing edge wall at the trailing edge region, the pressure sidewall being spaced from the suction sidewall between the leading edge and trailing edge walls to form a cavity therebetween for receiving cooling air,
  a tip region having a tip wall which extends in a chordwise direction between the suction sidewall and the pressure sidewall, a first rib which extends in the spanwise direction in the midchord region to the tip wall to divide the cavity into a front portion and a rear portion, the front portion having a second rib which extends from the root wall to the tip wall and is spaced from the leading edge leaving a first leading edge passage having a single leg therebetween which is in flow communication with the first cooling air duct, a third rib which extends from the root wall, which is spaced chordwise from the first rib leaving the first leg of the front serpentine passage therebetween, which bounds the second leg, and which is spaced spanwise from the tip wall leaving a first turn region therebetween which connects the first leg to the second leg, and a fourth rib which extends spanwise from the tip wall, which is spaced chordwise from the third rib to bound the second leg, which is spaced chordwise from the second rib to leave the third leg therebetween and is spaced spanwise from the root wall leaving a second turn region therebetween for the front serpentine passage;

the rear portion having a fifth rib which extends from the root wall, which is spaced chordwise from the first rib leaving the first leg of the rear serpentine passage therebetween, which bounds the second leg, and which is spaced spanwise from the tip wall leaving a first turn region therebetween which connects the first leg to the second leg for the rear serpentine passage, and a sixth rib which extends spanwise from the tip wall, which is spaced chordwise from the fifth rib to bound the second leg, which is spaced chordwise from the trailing edge rib leave the third leg therebetween and which is spaced spanwise from the root wall leaving a second turn region therebetween for the rear serpentine passage;

wherein the first cooling air duct is in flow communication with the front portion of the cooling air cavity for supplying cooling air to the leading edge passage and the front serpentine passage, the second cooling air duct is in flow communication with the rear portion of the cooling air cavity for supplying cooling air to the rear serpentine passage and wherein the associated plenum of each cooling air duct is adjacent the cavity and has an increase in average cross-sectional area as compared to the first average cross-sectional area upstream of the plenum which is adapted to reduce the velocity of the cooling air under operative conditions to increase the static pressure of the cooling air and reduces flow losses in the duct;

wherein the front serpentine passage, the rear serpentine passage and the third leading edge passage each have an exhaust opening which extends through the tip region of the airfoil to the exterior of the airfoil to place the end of the passage in flow communication with the exterior of the airfoil and wherein the trailing edge wall has a plurality of cooling holes which extend in a generally chordwise direction through the trailing edge wall to place the third leg of the rear passage in flow communication with the exterior of the airfoil;

wherein the front serpentine passage, the rear serpentine passage and the third leading edge passage each have at least one array of trip strips on the suction sidewall and at least one array of trip strips on the pressure sidewall to form at least two arrays of trip strips for each passage, the trip strips of each sidewall being spaced spanwise one from the other with a pitch and spaced spanwise from the trip strips on the other wall, each trip strip having a height measured from the adjacent portion of the sidewall and a trip strip height to pitch ratio and each trip strip forming an acute angle on the upstream side with the spanwise airfoil structure that bounds the serpentine passage;

wherein the third passage disposed between the leading edge and the third leg of the forward most serpentine passage has a first portion adjacent to the root and a second portion adjacent to the tip and having a trip strip height and trip strip height to pitch ratio which is greater than that of the first portion and wherein each trip strip forms an acute angle on the upstream side of the trip strip with the first rib for driving a portion of cooling air flow toward the forwardmost first rib under operative conditions;

wherein the arrays of trip strips in the legs of the front serpentine passage and the rear serpentine passage form an acute angle on the upstream side of the trip strip with the spanwise airfoil structure bounding the passage which is closest to the associated edge region to drive a portion of cooling air flow toward such structure which is closest to the associated edge of the airfoil under operative conditions;

wherein the arrays of trip strips in the legs of the front serpentine passage and the rear serpentine passage that are disposed in the first leg and the second leg each have no increase in the trip strip height and trip strip height to pitch ratio for the associated leg and over the entire leg which increases the ease of inspection and fabrication during manufacture of the airfoil;

wherein the front serpentine passage and the rear serpentine passage in the third leg of each passage have trip strips with both a trip strip height and trip strip height to pitch ratio over at least a portion of the third leg which is greater than that of the second leg to provide a greater increase in heat transfer effectiveness of the third leg over the second leg than exists between the second leg and the first leg as the flow of cooling air proceeds in the downstream direction;

wherein the front serpentine passage and the rear serpentine passage in the third leg of each passage have a first portion which receives cooling air from the second leg and a second portion outwardly of the first portion, and wherein the arrays of the trip strips for the third leg which are disposed in the second portion have a trip strip height and a trip strip height to pitch ratio which is greater than that of the associated array in the first portion and greater than that of the corresponding array in the second leg and wherein the arrays of trip strips in the second leg have a trip strip characteristic selected from the group consisting of trip strip height or trip strip height to pitch ratio which is greater than that of the corresponding trip strip characteristic of the first leg to sequentially increase the heat transfer effectiveness of the second and third legs in the downstream direction.

\* \* \* \* \*